(12) United States Patent
Fimml et al.

(10) Patent No.: US 12,025,067 B2
(45) Date of Patent: Jul. 2, 2024

(54) INTERNAL COMBUSTION ENGINE

(71) Applicant: INNIO Jenbacher GmbH & Co OG, Jenbach (AT)

(72) Inventors: Wolfgang Fimml, Tirol (AT); Nikolaus Spyra, Innsbruck (AT); Herbert Schaumberger, Muenster (AT); Matthias Raibel, Innsbruck (AT); Robert Boewing, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/038,208

(22) PCT Filed: Nov. 23, 2020

(86) PCT No.: PCT/AT2020/060416
§ 371 (c)(1),
(2) Date: May 23, 2023

(87) PCT Pub. No.: WO2022/104401
PCT Pub. Date: May 27, 2022

(65) Prior Publication Data
US 2024/0018916 A1    Jan. 18, 2024

(51) Int. Cl.
*F02B 19/10*    (2006.01)
*F02B 19/12*    (2006.01)
(Continued)

(52) U.S. Cl.
CPC .......... *F02D 41/0027* (2013.01); *F02B 19/10* (2013.01); *F02B 19/1052* (2013.01);
(Continued)

(58) Field of Classification Search
CPC ...................... F02B 19/00–18; F02D 41/0027
(Continued)

(56) References Cited

U.S. PATENT DOCUMENTS 9,574,487 B2   2/2017   Gruber et al.
10,323,566 B2  6/2019   Fuchs
(Continued)

FOREIGN PATENT DOCUMENTS

DE    102015202193 A1    8/2016
DE    102018213758 A1    2/2020
(Continued)

OTHER PUBLICATIONS

PCT International Search Report and Written Opinion; Application No. PCT/AT2020/060416; dated Jul. 12, 2021; 16 pages.

*Primary Examiner* — Erick R Solis
(74) *Attorney, Agent, or Firm* — Fletcher Yoder, P.C.

(57) ABSTRACT

An internal combustion engine includes transfer passages between a pre-chamber and a main combustion chamber, and a control unit configured to control a pre-chamber supply system coupled to the pre-chamber and a main combustion chamber supply system coupled to the main combustion chamber, wherein the control unit is configured to control the pre-chamber supply system such that a supply volume exceeds a volume of the pre-chamber and that a surplus of the supply volume is communicated to the main combustion chamber, such as during a transient operating condition.

24 Claims, 5 Drawing Sheets

(51) Int. Cl.
    *F02D 19/02*     (2006.01)
    *F02D 41/00*     (2006.01)
    *F02D 41/10*     (2006.01)

(52) U.S. Cl.
    CPC ............ *F02B 19/12* (2013.01); *F02D 19/022* (2013.01); *F02D 19/023* (2013.01); *F02D 41/10* (2013.01)

(58) Field of Classification Search
    USPC .................................................. 123/253–293
    See application file for complete search history.

(56) References Cited

U.S. PATENT DOCUMENTS

| | | | |
|---|---|---|---|
| 2014/0224208 A1 | 8/2014 | Gruber et al. | |
| 2016/0215682 A1* | 7/2016 | Hiltner | F02B 19/1023 |
| 2016/0341105 A1* | 11/2016 | Gu | F02B 19/10 |
| 2017/0101948 A1 | 4/2017 | Kunkel | |
| 2018/0135505 A1 | 5/2018 | Fuchs | |
| 2018/0363539 A1* | 12/2018 | Shelby | F02B 19/12 |
| 2019/0032544 A1* | 1/2019 | Vattaneo | F02B 19/1061 |
| 2023/0167762 A1* | 6/2023 | Spyra | F02B 19/1028 |
| | | | 123/258 |

FOREIGN PATENT DOCUMENTS

| | | | | |
|---|---|---|---|---|
| DE | 102018132032 A1 | | 6/2020 | |
| DE | 102019129552 A1 | * | 5/2021 | .......... F02B 19/1042 |
| EP | 3303804 A1 | | 4/2018 | |
| EP | 3434887 A1 | | 1/2019 | |
| WO | 2013056284 A2 | | 4/2013 | |
| WO | 2015172873 A2 | | 11/2015 | |
| WO | 2016187628 A1 | | 12/2016 | |

\* cited by examiner

INTERNAL COMBUSTION ENGINE

CROSS-REFERENCE TO RELATED APPLICATION

This application is a National Stage entry from, and claims benefit of, PCT Application No. PCT/AT2020/060416, filed on Nov. 23, 2020; entitled "INTERNAL COMBUSTION ENGINE", which is herein incorporated by reference in its entirety.

BACKGROUND

The present invention concerns an internal combustion engine comprising a pre-chamber and a method for operating such an internal combustion chamber.

Internal combustion engines according to the prior art comprise
- a main combustion chamber,
- a pre-chamber of smaller volume than the main combustion chamber,
- transfer passages which establish fluid communication between the pre-chamber and the main combustion chamber,
- a pre-chamber supply system equipped to supply a fuel or a first air fuel mixture to the pre-chamber,
- a main combustion chamber supply system equipped to supply air or a second air fuel mixture to the main combustion chamber, and
- a control unit configured to closed or open loop control the pre-chamber supply system in order to supply the supply volume of the fuel or the first-air-fuel mixture to the pre-chamber.

In general, pre-chambers are used to improve the ignition performance of internal combustion engines with a large swept volume, which are operated with a lean burn concept. Examples would be gas engines which have a swept volume of six litres or more per main combustion chamber. Here, a lean burn concept may be preferable in order to reduce unwanted emissions, such as NOx and unburnt hydrocarbons.

Because of the lean air fuel mixture in the main combustion chamber, the ignition performance can suffer as lean air fuel mixtures exhibit a reduced tendency towards controlled combustion.

Pre-chambers according to the prior art (and also according to the invention) are used as ignition amplifiers, wherein initially a smaller volume of air fuel mixture within the pre-chamber is ignited by, e.g., a spark plug. This combustion of a smaller volume of air fuel mixture is then transferred to the main combustion chamber through the transfer passages, resulting in flame jets expanding into the main combustion chamber. These flame jets promote a fast and thorough combustion in the main combustion chamber.

Another challenge for large internal combustion engines, in particular gas engines used for driving a generator supplying electrical energy to a power grid, is the handling of load changes, or in general transient operation conditions. This is particularly true for mixture charged engines, because there may be a delay between a change in the fueling condition of the mixture and the altered mixture actually arriving at the main combustion chamber, simply because of the travel time between the main compressor and the intake manifold.

BRIEF DESCRIPTION

An aspect of the invention, according to certain embodiments, is to provide an internal combustion engine and a method for operating an internal combustion engine, with improved behaviour during transient operation conditions.

Regarding the internal combustion engine, this aspect is achieved with the characteristics of the claims set forth below, wherein the control unit is configured to closed or open loop control the pre-chamber supply system, such that the supply volume exceeds the volume of the pre-chamber and that a surplus of the supply volume is communicated to the main combustion chamber through the transfer passages for mixing of the supply volume supplied to the pre-chamber with the air or the second air fuel mixture supplied to the main combustion chamber, preferably during a transient operation condition.

Regarding the method, this aspect is achieved with the characteristics of the claims set forth below, wherein
- a supply volume of a fuel or a first air fuel mixture is supplied to a pre-chamber of the internal combustion engine, which supply volume exceeds a volume of the pre-chamber,
- air or a second air fuel mixture is supplied to a main combustion chamber,
- a surplus of the supply volume is communicated to a main combustion chamber of the internal combustion engine through transfer passages between the pre-chamber and the main combustion chamber, and
- the surplus of the supply volume mixes with the air or the second air fuel mixture supplied to the main combustion chamber.

According to certain embodiments of the invention, the internal combustion engine can have preferably more than one main combustion chamber embodied and/or operated according to the invention. One, preferably only one, pre-chamber can be associated to each main combustion chamber in the sense that the pre-chamber is in fluid communication with the associated main combustion chamber via the transfer passages.

Certain embodiments of the invention concern internal combustion engines in which the pre-chamber is supplied with fuel or a first air fuel mixture and the main combustions chamber is supplied with air or a second air fuel mixture.

Therefore, the resulting mixture of air and fuel in the main combustion chamber can be a mixture of:
- the surplus of fuel supplied to the pre-chamber and air supplied to the main combustion chamber,
- the surplus of the first air fuel mixture supplied to the pre-chamber and air supplied to the main combustion chamber,
- the surplus of fuel supplied to the pre-chamber and the second air fuel mixture supplied to the main combustion chamber,
- the surplus of the first air fuel mixture supplied to the pre-chamber and the second air fuel mixture supplied to the main combustion chamber.

In other words, the surplus of the supply volume augments and/or replaces the air or the second air fuel mixture in the main combustion chamber. Regarding replacing surplus of the air or second air fuel mixture, the fuel or first air fuel mixture can be present in the main combustion chamber before the air or second air fuel mixture for the main combustion chamber and therefore prevent some of the volume of the air or second air fuel mixture from entering the main combustion chamber. In this sense, the surplus of fuel or first air fuel mixture can replace the air or second air fuel mixture in the main combustion chamber.

According to certain embodiments of the invention, the term fuel refers to either a single fuel or a composition of different fuels.

In preferred embodiments, the fuel supplied to the pre-chamber (either by itself or as part of the first air fuel mixture) and the fuel supplied to the main combustion chamber as part of the second air fuel mixture can be the same fuel or composition of fuel. However, it is of course conceivable to use different fuels or fuel compositions for the pre-chamber and the main combustion chamber.

The volume of the pre-chamber can be between 0.5% and 5%, preferably between 0.75% and 3% and particularly preferably between 1% and 1.5%, compared to a swept volume of the main combustion chamber.

Further advantageous embodiments are defined in the dependent claims.

The pre-chamber supply system can comprise a pre-chamber valve, the operation of which is controlled by the control unit to open or close in order to supply the supply volume to the pre-chamber. In the terminology of embodiments of the invention, such pre-chamber valves are called "active" pre-chamber valves.

The supply system can comprise
an actuator for adjusting a pressure in the pre-chamber supply system, and
a passive pre-chamber valve, in particular a check valve, which is actuated by a pressure difference between the pre-chamber supply system and the pre-chamber, wherein the control unit is configured to closed or open loop control the actuator.

In such embodiments, the actuator can, for example, be a compressor or a pressure regulator as mentioned below.

The control of the pre-chamber supply system can facilitate a time selective overspilling of the pre-chamber.

Embodiments with a passive as well as an active pre-chamber valve are in principle conceivable. However, embodiments with either an active or a passive pre-chamber valve are preferred.

The control unit can be provided at the location of the internal combustion engine as part of the overall engine control or as a separate control unit, which is dedicated to the control of the pre-chamber valve and possibly other control functions for the internal combustion engine. However, the control unit can also be spatially separated from the internal combustion engine, for example, as a software module of a computer server structure.

Supplying the supply volume, which exceeds the volume of the pre-chamber, and communicating the surplus of the supply volume to the main combustion chamber can preferably be carried out only during transient operation conditions.

According to certain embodiments of the invention, the control unit can be preferably configured to closed or open loop control the pre-chamber supply system to supply the supply volume, which exceeds the volume of the pre-chamber, during, preferably only during, transient operation conditions.

In particular for gensets, that is gas engines used to drive a generator for providing electrical energy to a power grid, transient operation conditions and load changes can stem from events, where for example the voltage or other parameters of the grid undesirably change. In such situations, the genset has to be able to perform according to so-called grid codes, which are given according to the country the genset is operating in (e.g., defined in DIN ISO 8528-5).

A change in load or power output can also be formulated in terms of a changed torque or a changed torque request.

An advantage according to certain embodiments of the invention is that—not only in transient operation conditions (see below), but also in steady state operation conditions—with fully fledged separate pre-chamber supply systems and main combustion chamber supply systems, optimized mixtures and injection windows for both the pre-chamber and the main combustion chamber can be achieved. This can be used to improve the efficiency of the internal combustion engine and to reduce emissions (e.g., unburnt hydrocarbons and NOx) resulting in an overall improvement of the engine's performance.

Supplying more fuel or first air fuel mixture to the pre-chamber than the volume of the pre-chamber can be called "over-scavenging" or "over-spilling". The advantage is that the pre-chamber supply system in many cases can react quicker to the transient operation conditions (i.e., the change in load and/or power output) than the main combustion chamber supply system, in particular a mixing device for preparing the second air fuel mixture. Further delay in responding to a transient operation requirement can stem from the travel time of the second air fuel mixture from the mixing device to the main combustion chamber (e.g., through the intake manifold). This is also something over-scavenging, according to certain embodiments of the invention, can prevent or at least reduce by bridging this delay/gap.

Further situations or circumstances where over scavenging can be used to achieve advantageous effects are for example:
Over-scavenging the pre-chamber can result in a faster start-up operation (although the start-up operation could also be classified as a transient operation requirement).
During idling, the pre-chamber can be over-scavenged in order to prevent misfiring due to inert gases (such as, e.g., fuel rich zones which do not combust properly).
During a cold start, pre-heating of the air fuel mixture can be achieved easily in the pre-chamber supply system in order to avoid condensation of the air fuel mixture. In this way, reduced cycle to cycle fluctuations and thus increased operation robustness as well as reduced deposits and combustion stability can be achieved.
During the exhaust stroke (i.e., when the exhaust valves are open), the pre-chamber can be over-scavenged in order to provide hydrocarbons in the exhaust gas. This can be used selectively in order to heat and/or regenerate a catalytic exhaust aftertreatment system. In this way, the thermal operation boundary (thermal operation window) can be enlarged.

The pre-chamber valve can be configured to realise different degrees of opening (other than the completely open and the completely closed positions) controlled by the control unit (i.e., the control unit can open or closed loop control the degree of opening).

The pre-chamber supply system can include a pre-chamber rail for delivering the fuel or the first air fuel mixture to the pre-chamber, wherein the pre-chamber valve is arranged (in fluid communication sense) between the pre-chamber rail and the pre-chamber for time selectively supplying the fuel or the first air fuel mixture from the pre-chamber rail to the pre-chamber.

The pre-chamber supply system can include at least one of:
a first volume flow control valve for controlling a first volume flow of fuel for the pre-chamber or for mixing with air to obtain the first air fuel mixture,
a second volume flow control valve for controlling a second volume flow of air for mixing with the fuel to obtain the first air fuel mixture, a compressor for compressing the fuel or the first air fuel mixture, a cooling device for cooling the fuel or the first air fuel mixture, a condensate separator for removing moisture from the fuel or the first air fuel mixture, a heater for heating the fuel or the first air fuel mixture, a pressure regulator for controlling the pressure of the fuel or the first air fuel mixture, and/or a buffer for storing a storage volume of the fuel or first air fuel mixture upstream of the pre-chamber valve at a higher pressure level compared to the pressure level prevailing immediately upstream of the pre-chamber valve.

The pressure regulator can be embodied as a controlled (e.g., closed or open loop) and/or as an orifice in the pre-chamber rail, which orifice has a smaller cross-section than the rest of the pre-chamber rail.

The condensate separator (optionally together with the cooling device and/or the heater) allows dehumidification of high moisture mixtures/fuels, which can reduce deposits in the pre-chamber supply system enabling a stable operation of the internal combustion engine over its lifetime.

The buffer for storing a storage volume of the fuel or the first fuel upstream of the pre-chamber can comprise a (relatively small) pump and/or compressor for achieving the higher pressure, in particular a mechanically driven pump and/or an electrically driven pump and/or by making use of pressure fluctuations (in analogy to a membrane pump).

Such a pump and/or compressor can be mechanically driven by a drivetrain providing mechanical energy from the crank shaft of the internal combustion engine and/or from a turbo charger or a turbo compound unit. Turbo compound units are to be understood as combinations of a compressor and an exhaust gas turbine, where the energy created by the exhaust gas turbine are only or additionally (i.e., additional to a mechanical energy transfer between the compressor and the exhaust gas turbine via, e.g., a drive shaft) stored and/or transferred to the compressor and/or to other components of the internal combustion engine.

The higher pressure level for the buffer can in some embodiments be achieved without the necessity of an additional pump and/or compressor. For example, the higher pressure level can simply be stored in the buffer during a full and/or high load operation condition of the internal combustion engine and then be used during a subsequent (can be directly after the full load operation condition or after some intermediate time) transient operation condition. It is, of course, possible to use this measure in combination with a pump and/or compressor for the buffer.

The compressor, the pressure regulator, but also for example the buffer, can embody the actuator for adjusting the pressure in the pre-chamber supply system mentioned above.

The pre-chamber supply system can additionally or optionally comprise a filter for purifying the fuel and/or second air fuel mixture in the pre-chamber supply system, and/or a flame barrier for preventing the spreading of deflagration.

The main combustion chamber supply system can include an intake manifold for air or the second air fuel mixture and preferably a mixing device for providing the second air fuel mixture.

The main combustion chamber supply system can include a main compressor, a mixture cooler, and/or a throttle valve. A throttle valve is also known as flap.

The main compressor can be the compressor of a turbo charger including an exhaust gas turbine driving the main compressor via a drive shaft. Other ways of driving the main compressor, for example, with an electrical motor, are of course conceivable.

The pre-chamber rail can be supplied by the main combustion chamber supply system through a supply channel, which branches off the main combustion chamber supply system. That is, the supply channel can be used to branch off air or the second air fuel mixture from the main combustion chamber supply system.

The air or the second air fuel mixture supplied to the pre-chamber rail via the supply channel from the main combustion chamber supply system can be enriched with fuel in order to provide the first air fuel mixture for the pre-chamber. As mentioned before, the fuel for enriching the second air fuel mixture from the main combustion chamber supply system can be the same fuel or fuel composition used for the second air fuel mixture or can be a different fuel or fuel composition.

In principle, it is of course also conceivable to add air to the second air fuel mixture in order to prepare the first air fuel mixture.

The supply channel can branch off the main combustion chamber supply system in fluid communication sense:

before or after a low-pressure mixing device for providing the second air fuel mixture (preferably common for all or a group of main combustion chambers), and/or before or after the main compressor for creating a charge pressure for the main combustion chamber (preferably common for all or a group of main combustion chambers), and/or before or after a mixture cooler (preferably common for all or a group of main combustion chambers), and/or before or after a further mixture cooler (preferably common for all or a group of main combustion chambers), and/or before or after a throttle valve (preferably common for all or a group of main combustion chambers), and/or in or after a part of the intake manifold common for all or a group of main combustion chambers, and/or individually for each main combustion chamber in an intake channel of the main combustion chamber.

For the options for which "preferably common for all or a group of main combustion chambers" is specified, it is in principle conceivable to branch off the supply channel individually for each combustion chamber. However, the in general preferred embodiments according to the invention realise a common branch off point into a common pre-chamber rail, because of a less complex overall design. For embodiments with combustion chamber individual (e.g., cylinder individual) branching off points, of course, there have to be main combustion chamber individual supply channels and pre-chamber rails and potentially combustion chamber individual first volume flow control valves, second volume flow control valves, compressors, cooling devices, condensate separators, heaters, pressure regulators, and/or buffers as mentioned earlier.

The previously mentioned mixing device can be the low-pressure mixing device. However, embodiments where the mixing device and the low-pressure mixing device are separate are in principle conceivable.

The expression "in fluid communication sense before" is used interchangeably with "upstream". The expression "in fluid communication sense after" is used interchangeably with "downstream".

The expression "in fluid communication sense individually for each main combustion chamber" can be understood to mean that the branch of the supply channel is after a branching of the intake manifold for the individual main combustion chambers.

In the following some advantages of different branching off points for the supply channel are collected:

Directly after the main compressor: here the highest pressures and temperatures in the main combustion chamber supply system are present so that the overspilling of the pre-chamber can be maximised and/or condensation of moisture can be avoided. Additionally, if a throttle valve is present, a pressure difference between the fuel or first air fuel mixture in the pre-chamber supply system and the air or second air fuel mixture supplied to the main combustion chamber can be controlled (e.g., closed or open loop controlled).

Directly after a mixture cooler, in particular between the mixture cooler and—if present—the further mixture cooler: here the pressure is still relatively high and if a throttle valve is present the pressure difference mentioned above can be controlled. Additionally, the volume flow in the main combustion chamber supply system after the mixture cooler may contain smaller amounts of contaminants from bearing lubricants of the main compressor (blow by) due to deposition in the mixture cooler.

After the throttle valve, in particular directly after the throttle valve: if desired, an influence of the position of the throttle valve on the pressure in the pre-chamber supply system can be eliminated.

Combustion chamber individual branching off in the intake manifold can be advantageous when compared with the combustion chamber individual branching off in the combustion chamber individual intake channels for the main combustion chambers (as for example disclosed in EP 3303804 A1), because pressure fluctuations stemming from opening and closing of the intake valves of each individual main combustion chamber are usually dampened to an acceptable amount. This advantage is of course also present for all other branching off points upstream of the combustion chamber individual intake channels.

In general, the potential further advantages of common branching off points of the supply channel can be:

Central pressure reduction (e.g., a single orifice or a single valve) possible,

Central purification of the first air fuel mixture in the pre-chamber supply system possible, e.g., by employing a filter (e.g., a small blow-by filter), and Central flame barrier possible.

Advantages of combustion chamber individual branching off points for the supply channels can be:

"Balancing" of the performance of a plurality of main combustion chambers by (slightly) varying the pressure in the combustion chamber individual pre-chamber rails (e.g., cylinder balancing) is possible.

Compact design because of short lengths of the different conducts (e.g., pre-chamber rails, supply channels) is possible. Short lengths of conducts can be advantageous because of lower pressure drops and less travel time through shorter conducts and therefore shorter delay in pressure and lambda variations, which can negatively impact transient operation behaviour. Additionally: Low danger of condensation because of short lengths of conducts.

In particular for combustion chamber individual branching off of the supply channels: variations in pressure and lambda are the same or at least similar for the fuel or first air fuel mixture for the pre-chamber and the air or second air fuel mixture for the main combustion chamber, which can be particularly advantageous during transient operation conditions and/or the start-up operation.

Supplying the supply volume, which exceeds the volume of the pre-chamber and communicating the surplus of the supply volume to the main combustion chamber can be carried out as long as an actual operation parameter of the internal combustion engine, in particular an engine revolution rate, a power of the internal combustion engine, and/or a load of the internal combustion engine differs from a set engine operation parameter by more than %, preferably more than 5% and particularly preferably by more than 1%, in reference to the set engine operation parameter.

In this way, a criterion for how long a transient operation condition lasts can be easily implemented.

It can be provided that a set fuel energy amount (e.g., denoted by $E_f$) for combustion in the main combustion chamber is set and that the control unit is configured to control the pre-chamber supply system such that:

a first fuel energy amount (e.g., denoted by $E_1$) pertaining to the surplus of the supply volume communicated to the main combustion chamber (2) and a second fuel energy amount (e.g., denoted by $E_2$) pertaining to the air or second air fuel mixture supplied to the main combustion chamber (2)

add up to the set fuel energy amount $E_f$, preferably in each combustion cycle during the transient operation condition.

Expressed differently, preferably in each combustion cycle, the pre-chamber supply system is open or closed loop controlled such that:

$$E_1(t)+E_2(t)=E_f$$

It should be mentioned that the set fuel energy amount $E_f$ (and of course the first fuel energy amount and the second fuel energy amount, see examples in FIG. 4a and FIG. 4b) can change over time, e.g., in the form of a changed set fuel energy amount from one cycle of the main combustion chamber to another and/or from one cycle of a bank of main combustion chambers to another and/or from one cycle of all the main combustion chambers to another. In particular, if the load of the internal combustion engine is increased, the set fuel energy amount $E_f$ can be increased, and if the load of the internal combustion engine is decreased, the set fuel energy amount $E_f$ can be decreased.

The first fuel energy amount $E_1$ pertaining to the surplus of the supply volume communicated to the main combustion chamber can in preferred embodiments at least at one point in time during a transient operation condition provide more than 10%, preferably more than 50%, more preferably more than 80%, more preferably more than 90% of the set fuel energy amount ($E_f$), such that a substantial amount of the fuel energy introduced into the main combustion chamber is supplied via overspilling of the pre-chamber.

Accordingly, in preferred embodiments of the invention, up to 90% of the energy fuel amount introduced into the main combustion chamber can be supplied via overspilling of the pre-chamber, when the engine experiences a larger load step.

In some embodiments, 100% of the set fuel energy amount can be provided through overspilling of the pre-chamber during a start-up operation of the internal combustion engine, in order to facilitate a fast start-up operation of the internal combustion engine.

While a control of the overspilling of the pre-chamber using energy amounts as control parameters is preferred as the energy amounts are pressure-independent and the pressures in the main combustion chamber supply system and the pre-chamber supply system can vary quickly and with quite a large magnitude, other control parameters can in principle be used according to certain embodiments of the invention.

According to certain embodiments of the invention, a surplus of the fuel or first air-fuel mixture can reach the main combustion chamber not only during transient operations conditions, but also during normal operation conditions, e.g., because of overspilling or short circuit scavenging. In preferred embodiments, however, the surplus reaching the main combustion chamber during not transient operation conditions is minor compared to the surplus reaching the main combustion chamber because of overspilling during transient operation conditions.

In some embodiments of the invention, the internal combustion engine does not necessarily have to be capable of being operated with significant overspilling, depending on design restrictions, such as for example available supply pressures, dead volumes, volumes in the pre-chamber supply system, transient behaviour of a turbo charger, or revolutions per time unit.

The different fuel energy amounts can preferably be given in terms of a heating value of the fuel scaled by the amount of the respective fuel present.

Embodiments of the invention can, as mentioned, be preferably be used for gas engines, in particular driving an electric generator for creating electrical energy from the mechanical energy provided by the gas engine (i.e., gensets).

The fuel used for gas engines is usually natural gas, where methane is usually the main component with other hydrocarbons as possible other components.

The internal combustion engine can in particular be a reciprocating piston engine. As mentioned, embodiments of the invention can be used on all or a group of the cylinders of the piston engine. Embodiments, where the invention is only used for a single cylinder are in principle conceivable.

BRIEF DESCRIPTION OF THE DRAWINGS

Further advantages and details regarding the invention are apparent from the figures and the accompanying description of the figures. The figures show.

DETAILED DESCRIPTION

Figure 1:
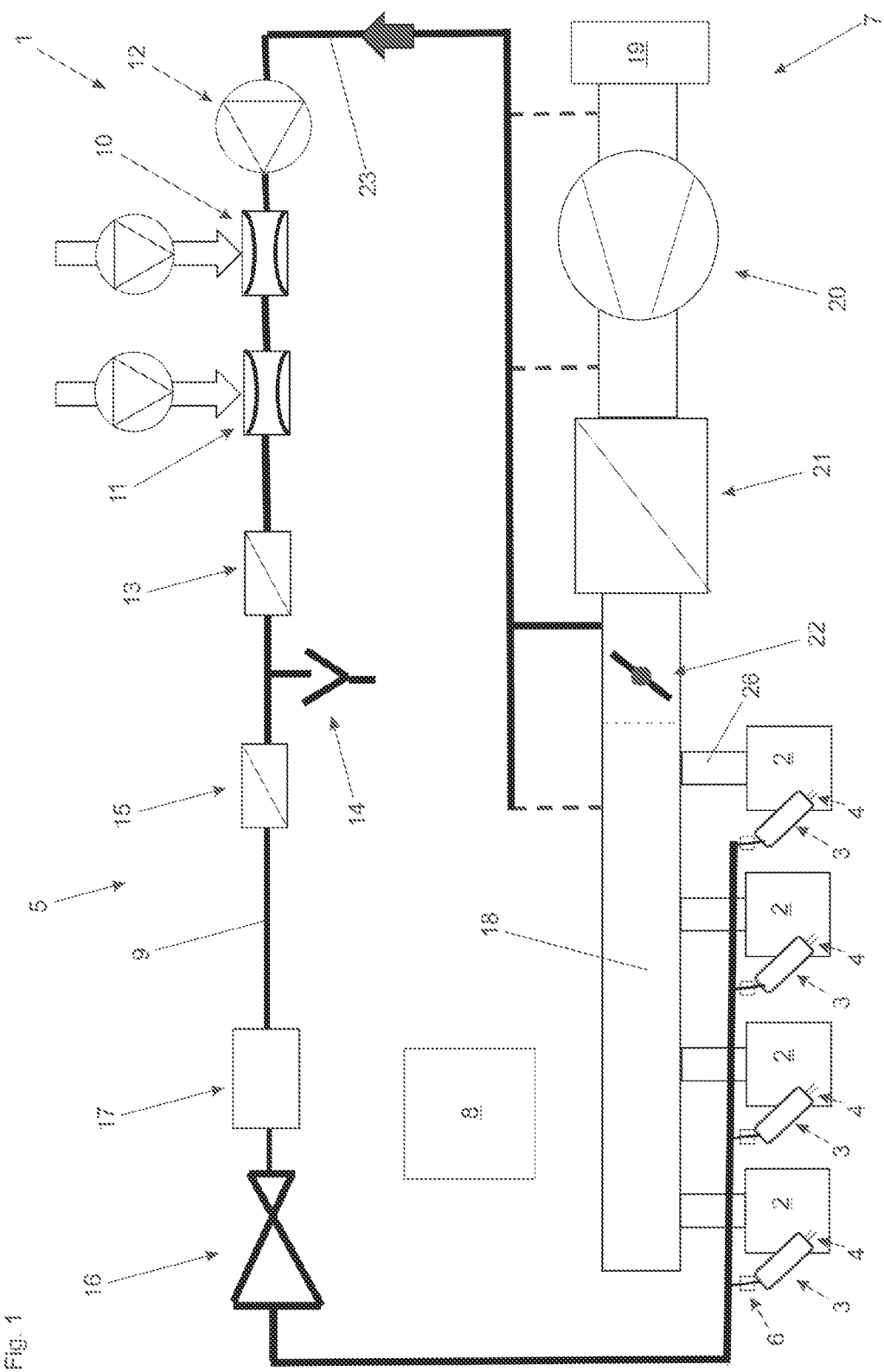
FIG. 1 is a schematic drawing of an embodiment of the invention.

FIG. 1 schematically shows a first embodiment of an internal combustion engine 1 according to the invention, here a gas engine. The main combustion chambers 2 are embodied as cylinders with a reciprocating piston (not shown). Four main combustion chambers 2 are shown purely exemplary. Large modern gas engines usually have significantly more cylinders.

Air or a second air fuel mixture is supplied to the main combustion chambers 2 through a main combustion chamber supply system 7, which in this embodiment includes a low-pressure mixing device 19. Alternatively or additionally, the main combustion chamber supply system 7 could include a mixing device downstream of the main compressor 20.

The main compressor 20 in this embodiment is a driven by a drive shaft driven by an exhaust turbine (both not shown) and thus is part of a turbo charger.

The main combustion chamber supply system 7 according to this embodiment further includes a mixture cooler 21 and a throttle valve 22.

The intake manifold 18 delivers the second air fuel mixture, or alternatively only air, to the cylinder-individual intake channels 26. In order to not impede the visual clarity of the drawing, the reference numeral is shown only for one intake channel 26.

As pointed out in the beginning of this document, ignition performance can be improved with pre-chambers 3. In this embodiment, one pre-chamber 3 is present for each main combustion chamber 2. The transfer passages 4, which provide fluid communication between each pre-chamber 3 and the respective main combustion chamber 2, are indicated schematically.

Fuel or a first air fuel mixture is supplied to the pre-chambers 3 through the pre-chamber supply system 5.

The first air fuel mixture can be created by branching off air or second air fuel mixture from the main combustion chamber supply system 7 via a supply channel 23 (or more supply channels), and potentially adding fuel and/or air through a first volume flow control valve 10 for adding fuel and/or a second volume flow control valve 11 for adding air. Conventionally, the first air fuel mixture is richer in fuel (i.e., lower lambda) than second air fuel mixture in order to achieve better ignition properties in the pre-chambers 3, although embodiments where a first air fuel mixture with a higher lambda than the second air fuel mixture or where the first air fuel mixture and the second air fuel mixture are the same are in principle conceivable.

The supply channel 23 in this embodiment branches off the main combustion chamber supply system 7 between the mixture cooler 21 and the throttle valve 22 in fluid communication sense. Three dashed lines show three other examples of where the supply channel 23 branches off the main combustion chamber supply system 7, namely between the low-pressure mixing device 19 and the main compressor 20, between the main compressor 20 and the mixture cooler 21, after the throttle valve 22 in the common part of the intake manifold 18.

In other embodiments, the supply channel 23 could branch off cylinder-individually from the intake channels 26 of the main combustion chambers 2. More possible branching off points are visualized in and described in connection with FIG. 5.

Combinations of the different options for where the supply channel 23 branches off the main combustion chamber supply system 7 are of course conceivable.

A further possibility is to omit the supply channel 23 entirely and provide the fuel and/or first air fuel mixture "fresh" by mixing the fuel with air from a fuel source (or just providing fuel).

As pointed out earlier, the fuel or fuel composition for the first air fuel mixture and the fuel or fuel composition for the second air fuel mixture can be the same fuel or different fuels or fuel compositions.

In one conceivable embodiment, the main combustion chamber supply system 7 only supplies air to the main combustion chambers 2 and the pre-chamber supply system 5 provides only fuel or the first air fuel mixture to the pre-chambers 3. The pre-chamber 3 is then over-scavenged in order to provide the necessary fuel component for the combustion in the main combustion chamber 2.

A pre-chamber rail 9 delivers the fuel or first air fuel mixture from where fuel or first air fuel mixture is provided (in the embodiment of FIG. 1 after the second volume flow control valve 11) to the pre-chambers, while the pre-chamber rail 9 possibly branches off into pre-chamber individual sections before reaching the pre-chamber valves 6. The supply channel 23 can also be viewed as part of the pre-chamber rail 9.

In the embodiment of FIG. 1, the following functional units are in the flow path in the pre-chamber rail 9:
the first volume flow control valve 10,
the second volume flow control valve 11,
the compressor 12,
a compressor 12 for raising the pressure in the pre-chamber rail 9,
a cooling device 13,
a condensate separator 14,
a heater 15,
a pressure regulator 16, and
a buffer 17.

These functional units can be used to condition the fuel or the first air fuel mixture in the pre-chamber rail 9 with the desired pressure and/or temperature and/or humidity.

The functional units do not have to be arranged in the fluid communication sequence as depicted in FIG. 1. As an example, FIG. 2 shows a different possible embodiment of the invention, where the first volume flow control valve 10 is arranged after the second volume flow control valve 11 and the buffer 17 is arranged before the pressure regulator 16 (both in fluid communication sense).

Figure 2:
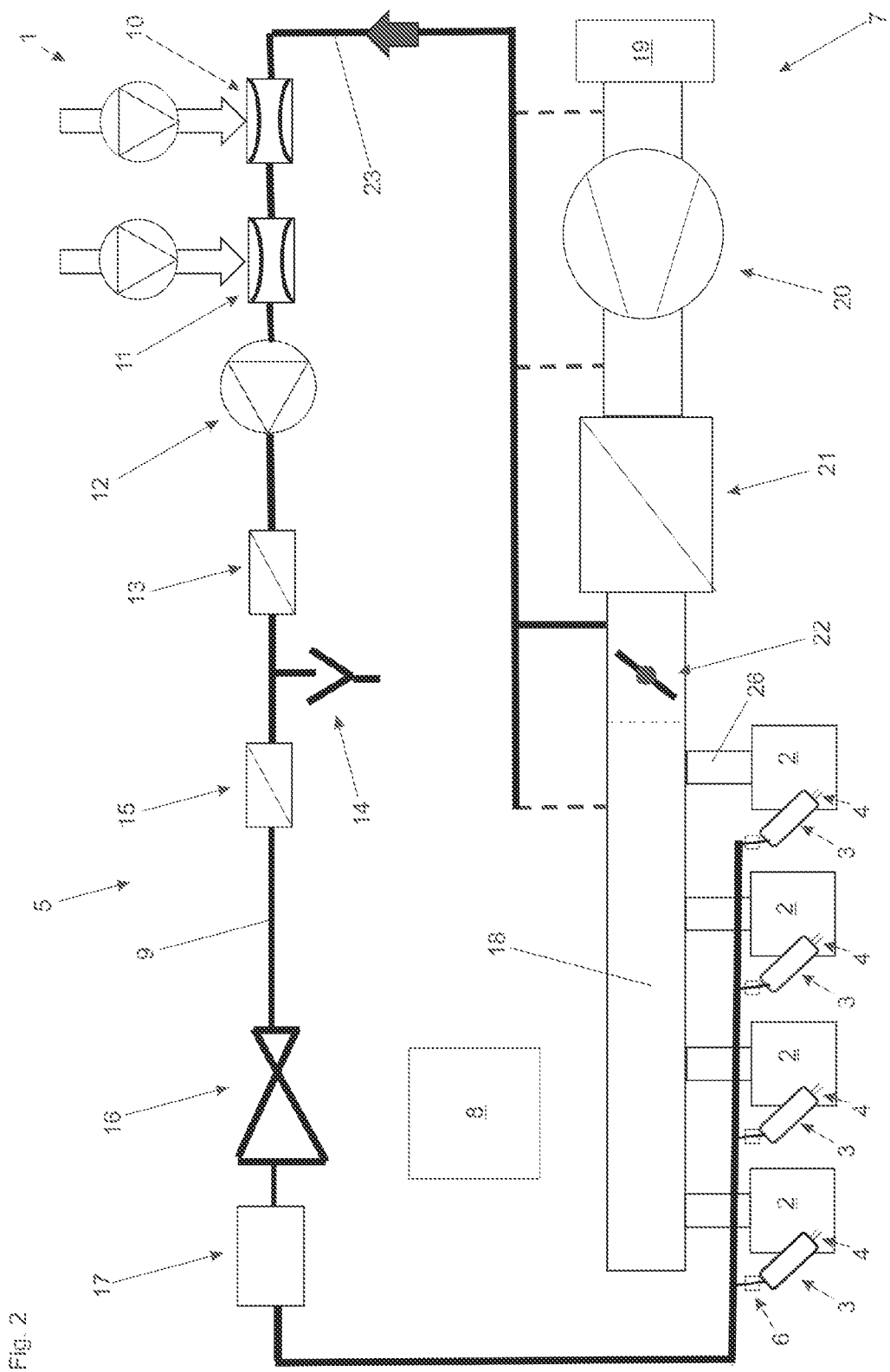
FIG. 2 is a schematic drawing of another embodiment of the invention.

Referring to both FIG. 1 and FIG. 2, the buffer 17 can for example be a volume which can be closed off upstream and optionally downstream using valves in order to store some of the fuel or first air fuel mixture in the pre-chamber rail 9 at a raised pressure. The raised pressure can be reached as previously described by making use of a further pump and/or compressor and/or by making use of pressure changes in the pre-chamber rail 9 and time selectively opening and closing the valves for shutting off the buffer volume.

The pre-chamber valves 6 can time selectively opened or closed, possibly at controllable opening degrees, in order to admit the fuel or first air fuel mixture to the pre-chambers.

For this, the control unit 8 open or closed loop controls the pre-chamber valves 6. Of course, signal connections are present between the control unit 8 and the pre-chamber valves 6, but they are not depicted in FIG. 1 and FIG. 2 in order to not impede the viewability of the figures.

In preferred embodiments, the control unit 8 controls the pre-chamber valves 6 such that the amount of fuel or first air fuel mixture from the pre-chamber rail 9 entering the pre-chambers 3 exceeds the volume of each of the pre-chambers 3 (over-scavenging).

A surplus of fuel or first air fuel mixture will then be communicated into the main combustion chambers 2, where it will mix with the air or second air fuel mixture in the main combustion chambers 2.

Preferably, during transient operation conditions, this can raise the amount of fuel (relative to the amount of air) in the main combustion chamber 2 in order to provide more power for a short period of time. Since the pre-chamber supply system 5 can more easily be adapted to react quicker and provide more fuel, in this way a faster reaction to transient operation conditions can be realised.

Of course, it is also possible in this way to reduce the amount of fuel or the amount of fuel in the first air fuel mixture in order to quickly reduce the amount of fuel in the main combustion chambers 2, in the event that a reduced power is required from the internal combustion engine 1.

Both FIG. 1 and FIG. 2 can be embodied differently by using a passive pre-chamber valve, e.g., in form of check valves with a pre-load.

In such embodiments, the control unit 8 can control (with the corresponding signal connections) the pressure regulator 16, the buffer 17, and/or the compressor 12 to produce a higher pressure in the pre-chamber rail 9 directly before (in fluid communication sense) the passive pre-chamber valves 6. This higher pressure will cause the pre-chamber valves 6 to stay open for a longer amount of time achieving the overspilling of the pre-chamber 3 according to certain embodiments of the invention.

Figure 3:
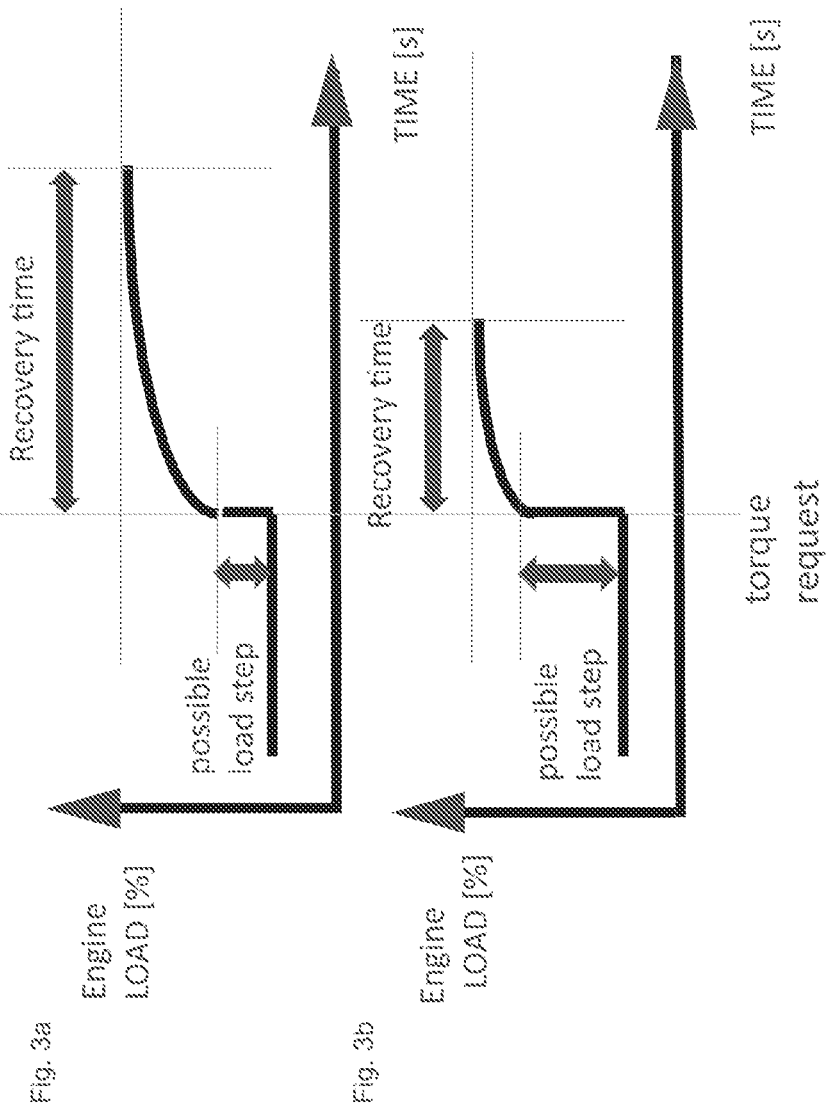
FIG. 3a, 3b are diagrams visualising the advantage of over-scavenging the pre-chamber.

FIG. 3*a* and FIG. 3*b* show a comparison of the engine load capability of an internal combustion engine according to the prior art (FIG. 3*a*) and an internal combustion engine 1 according to embodiments of the invention when an increased power requirement is present. As the comparison of FIG. 3*a* and FIG. 3*b* clearly shows the internal combustion engine 1 according to embodiments of the invention (FIG. 3*b*) is able to more quickly adapt to greater increases in power requirements (greater load step, shorter recovery time).

Figure 4:
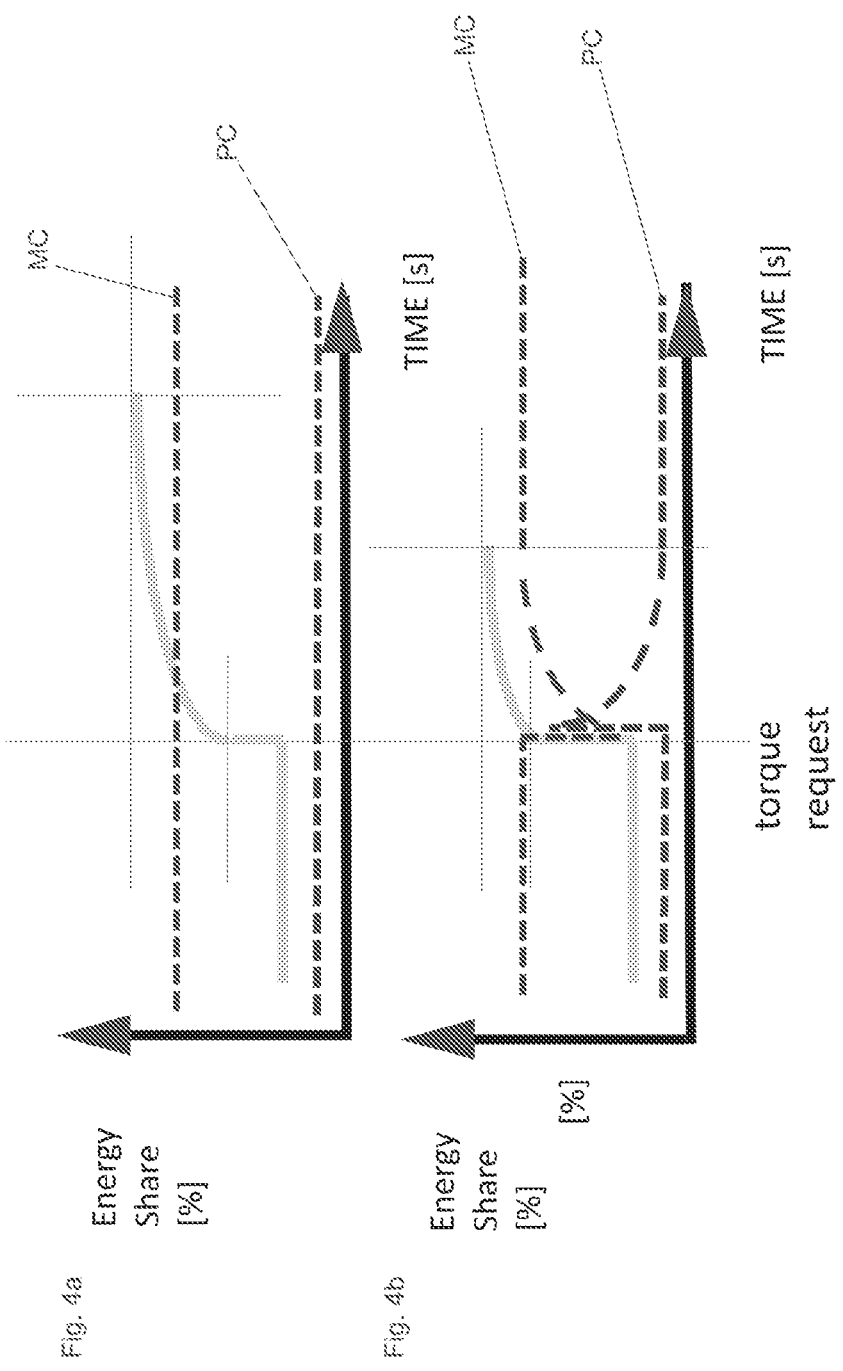
FIG. 4a, 4b are diagrams on the energy share of the fuel or first air fuel mixture during over-scavenging.

How this works is shown in FIGS. 4*a* and 4*b*, where the energy contribution from the fuel or first air fuel mixture from the pre-chamber (PC, for pre-chamber) and the second air fuel mixture (MC, for main combustion chamber) is shown over time. Again, FIG. 4*a* refers to an internal combustion engine according to the prior art and FIG. 4*b* refers to an internal combustion engine according to embodiments of the invention.

The increasing load request is shown as grey curve in both FIG. 4*a* and FIG. 4*b*.

Because the over-scavenging of the pre-chamber can very quickly (quicker than the main combustion chamber supply system 7) increase the amount of fuel (and therefore the amount of energy which can be generated by the combustion in the main combustion chamber) in the main combustion chamber, the internal combustion engine according to embodiments of the invention can react quicker to the changed torque or load request than the internal combustion engine according to the prior art.

It should be noted that the Y-axis (Energy share [%]) is normalized to the set fuel energy amount $E_f$ desired at each point in time. Upon occurrence of a higher torque request, the set fuel energy amount $E_f$ is raised in order to deal with the higher load/torque required. Relatively speaking, the energy share MC introduced into the main combustion chamber 2 therefore drops sharply at that point in time.

It should also be noted that the energy share PC rises at exactly the same time, but are drawn slightly next to each other in order to ensure clarity of the depiction.

Figure 5:
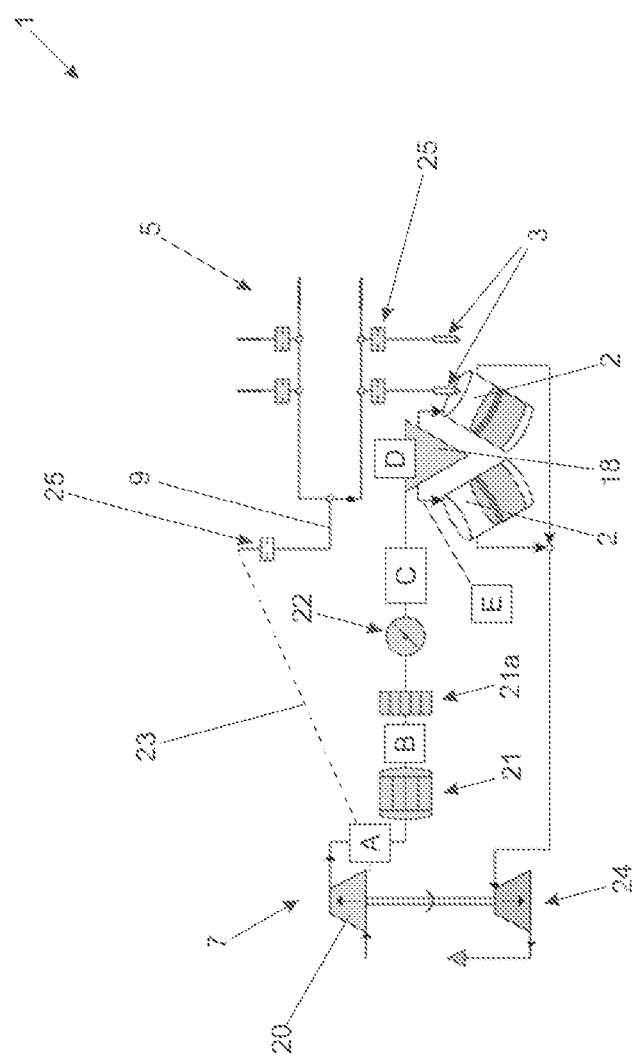
FIG. 5 is a further embodiment according to the invention visualising some branching off points for the supply channel.

FIG. 5 shows a further embodiment of the invention visualising different branching off points for the supply channel 23.

The pre-chamber supply system 5 is only partly shown and can otherwise be embodied as in FIG. 1 or FIG. 2. Furthermore, the pre-chamber rail 9 can separate in, e.g., two sub-branches for supplying pre-chambers 3 for, e.g., two cylinder banks which is shown symbolically.

Additionally, the pre-chamber rail 9 can comprise various orifices 25 either in a common part of the pre-chamber rail 9 for all main combustion chamber 2 (in this case cylinders with reciprocating pistons) or in cylinder-individual parts of the pre-chamber rail 9. Such orifices can serve to create a defined pressure drop in the pre-chamber rail 9 as needed.

The main combustion chamber supply system 7 comprises
- a main compressor 20 which is driven by an exhaust gas turbine 24 through a drive shaft to embody a turbo charger,
- a mixture cooler 21,
- a further mixture cooler 21a,
- a throttle valve 22, and
- a common part for all the main combustion chambers 2 of the intake manifold 18.

The main combustion chambers 2 are connected to the intake manifold 18 through cylinder-individual intake channels 26 (which are here not furnished with reference numerals in order to not overburden the figure).

Each pre-chamber 3 is associated with one main combustion chamber 2 as is shown symbolically.

Each branching off point A, B, C, D, and E is symbolised with a box and the according letter. The supply channel 23 common for all pre-chambers 3 for branching off points A, B, C, and D would run from the respective point to the common pre-chamber rail 9, which is symbolised only for branching off point A, but would be embodied analogously for the other branching off points B, C, and D.

Branching off point E would be a cylinder-individual branching off point where the pre-chamber supply system 5 would comprise cylinder-individual pre-chamber rails 9 for each cylinder.

The branching off points are:
A directly after the main compressor 20 and before the mixture cooler 21,
B between the mixture cooler 21 and the further mixture cooler 21a,
C after the throttle valve 22,
D in the common part of the intake manifold 18,
E cylinder-individual branching off in the intake channel 26 for each cylinder.

The invention claimed is:

1. An internal combustion engine, comprising
a main combustion chamber,
a pre-chamber of smaller volume than the main combustion chamber,
transfer passages which establish fluid communication between the pre-chamber and the main combustion chamber,
a pre-chamber supply system equipped to supply a fuel or a first air-fuel mixture to the pre-chamber,
a main combustion chamber supply system equipped to supply air or a second air fuel mixture to the main combustion chamber, and
a control unit configured to closed or open loop control the pre-chamber supply system in order to supply the supply volume of the fuel or the first air-fuel mixture to the pre-chamber,
wherein the control unit is configured to closed or open loop control the pre-chamber supply system, such that the supply volume exceeds the volume of the pre-chamber and that a surplus of the supply volume is communicated to the main combustion chamber through the transfer passages for mixing of the supply volume supplied to the pre-chamber with the air or the second air fuel mixture supplied to the main combustion chamber,
wherein a set fuel energy amount ($E_f$) for combustion in the main combustion chamber is given and the control unit is configured to control the pre-chamber supply system such that
a first fuel energy amount ($E_1$) pertaining to the surplus of the supply volume communicated to the main combustion chamber and
a second fuel energy amount ($E_2$) pertaining to the air or second air fuel mixture supplied to the main combustion chamber
add up to the set fuel energy amount ($E_f$).

2. The internal combustion engine according to claim 1, wherein the pre-chamber supply system comprises a pre-chamber valve, the operation of which is controlled by the control unit to time selectively open or close in order to supply the supply volume to the pre-chamber, wherein the pre-chamber valve is configured to realize different degrees of opening controlled by the control unit.

3. The internal combustion engine according to claim 1, wherein the control unit is configured to change the set fuel energy amount ($E_f$), the first fuel energy amount ($E_1$), and the second fuel energy amount ($E_2$) over time based on at least one operating parameter of the internal combustion engine.

4. The internal combustion engine according to claim 1, wherein the pre-chamber supply system comprises:
an actuator for adjusting a pressure in the pre-chamber supply system and
a passive pre-chamber valve, which is actuated by a pressure difference between the pre-chamber supply system and the pre-chamber,
wherein the control unit is configured to closed or open loop control the actuator.

5. The internal combustion engine according to claim 1, wherein the control unit is configured to supply the supply volume, which exceeds the volume of the pre-chamber, to provide the surplus to the main combustion chamber only during transient operation conditions.

6. The internal combustion engine according to claim 1, wherein the control unit is configured to change the first fuel energy amount ($E_1$) over time based on at least one operating parameter of the internal combustion engine.

7. The internal combustion engine according to claim 6, wherein the first fuel energy amount ($E_1$) pertaining to the surplus of the supply volume communicated to the main combustion chamber at least at one point in time during a transient operation condition provides more than 90% of the set fuel energy amount ($E_f$).

8. The internal combustion engine according to claim 2, wherein the pre-chamber supply system includes a pre-chamber rail for delivering the fuel or the first air fuel mixture to the pre-chamber, wherein the pre-chamber valve is arranged between the pre-chamber rail and the pre-chamber for supplying the fuel or the first air fuel mixture from the pre-chamber rail to the pre-chamber.

9. The internal combustion engine according to claim 1, wherein the pre-chamber supply system includes at least one of:

a first volume flow control valve for controlling a first volume flow of fuel for the pre-chamber or for mixing with air to obtain the first air fuel mixture, a second volume flow control valve for controlling a second volume flow of air for mixing with the fuel to obtain the first air fuel mixture, a compressor for compressing the fuel or the first air fuel mixture, a cooling device for cooling the fuel or the first air fuel mixture, a condensate separator for removing moisture from the fuel or the first air fuel mixture, a heater for heating the fuel or the first air fuel mixture, a pressure regulator for controlling the pressure of the fuel or the first air fuel mixture, and/or a buffer for storing a storage volume of the fuel or first air fuel mixture upstream of the pre-chamber valve at a higher pressure level compared to the pressure level prevailing immediately upstream of the pre-chamber valve.

10. The internal combustion engine according to claim 1, wherein the control unit is configured to control the pre-chamber supply system to control the first fuel energy amount ($E_1$) and the second fuel energy amount ($E_2$) to add up to the set fuel energy amount ($E_f$) in each combustion cycle.

11. The internal combustion engine according to claim 8, wherein the pre-chamber rail is supplied by the main combustion chamber supply system through a supply channel, which branches off the main combustion chamber supply system.

12. The internal combustion engine according to claim 11, wherein the air or the second air fuel mixture supplied to the pre-chamber rail via the supply channel from the main combustion chamber supply system can be enriched with fuel in order to provide the first air fuel mixture for the pre-chamber.

13. The internal combustion engine according to claim 11, wherein the supply channel branches off the main combustion chamber supply system in fluid communication sense before or after a low-pressure mixing device for providing the second air fuel mixture and/or before or after a main compressor for creating a charge pressure for the main combustion chamber and/or before or after a mixture cooler and/or before or after a further mixture cooler, and/or before or after a throttle valve and/or in or after a part of an intake manifold common for all or a group of main combustion chambers, and/or individually for each main combustion chamber in the intake manifold and/or an intake channel of the main combustion chamber.

14. A method for operating an internal combustion engine, comprising:

supplying a supply volume of a fuel or a first air fuel mixture to a pre-chamber of the internal combustion engine, which supply volume exceeds a volume of the pre-chamber;

supplying air or a second air fuel mixture to a main combustion chamber of the internal combustion engine;

communicating a surplus of the supply volume to the main combustion chamber through one or more transfer passages between the pre-chamber and the main combustion chamber;

mixing the surplus of the supply volume with the air or the second air fuel mixture in the main combustion chamber; and setting a set fuel energy amount ($E_f$) for combustion in the main combustion chamber and controlling a pre-chamber supply system such that a first fuel energy amount ($E_1$) pertaining to the surplus of the supply volume communicated to the main combustion chamber and a second fuel energy amount ($E_2$) pertaining to the air or second air fuel mixture supplied to the main combustion chamber add up to the set fuel energy amount ($E_f$).

15. The method according to claim 14, wherein supplying the supply volume, which exceeds the volume of the pre-chamber and communicating the surplus of the supply volume to the main combustion chamber is carried out selectively during transient operation conditions in response to at least one operating parameter of the internal combustion engine exceeding a threshold.

16. The method according to claim 15, wherein the at least one operating parameter comprises an engine revolution rate, a power of the internal combustion engine, and/or a load of the internal combustion engine, and the threshold comprises a change of at least 1%.

17. The method according to claim 14, wherein controlling the pre-chamber supply system comprises controlling the first fuel energy amount ($E_1$) and the second fuel energy amount ($E_2$) to add up to the set fuel energy amount ($E_f$) in each combustion cycle.

18. The method according to claim 14, wherein controlling the pre-chamber supply system comprises changing the first fuel energy amount ($E_1$) over time based on at least one operating parameter of the internal combustion engine.

19. The method according to claim 18, wherein the first fuel energy amount ($E_1$) pertaining to the surplus of the supply volume communicated to the main combustion chamber is variable between 10% and 100% of the set fuel energy amount ($E_f$) at least during a transient operation condition.

20. An internal combustion engine, comprising a main combustion chamber, a pre-chamber of smaller volume than the main combustion chamber, transfer passages which establish fluid communication between the pre-chamber and the main combustion chamber, a pre-chamber supply system equipped to supply a fuel or a first air-fuel mixture to the pre-chamber, a main combustion chamber supply system equipped to supply air or a second air fuel mixture to the main combustion chamber, and a control unit configured to closed or open loop control the pre-chamber supply system in order to supply the supply volume of the fuel or the first air-fuel mixture to the pre-chamber, wherein the control unit is configured to closed or open loop control the pre-chamber supply system, such that the supply volume exceeds the volume of the pre-chamber and that a surplus of the supply volume is communicated to the main combustion chamber through the transfer passages for mixing of the supply volume supplied to the pre-chamber with the air or the second air fuel mixture supplied to the main combustion chamber, at least during a transient operation condition, wherein the control unit is configured to vary the surplus of the supply volume communicated to the main combustion chamber at least during the transient operating condition.

21. The internal combustion engine according to claim 20, wherein the control unit is configured to vary the surplus of the supply volume communicated to the main combustion chamber in response to at least one operating parameter of the internal combustion engine exceeding a threshold.

22. The internal combustion engine according to claim 21, wherein the at least one operating parameter comprises a load of the internal combustion engine, and changes in the load exceeding the threshold indicate the transient operating condition.

23. The internal combustion engine according to claim 20, wherein the control unit is configured to vary the surplus of the supply volume communicated to the main combustion chamber only during the transient operating condition.

24. The internal combustion engine according to claim 20, wherein the control unit is configured to vary the surplus of the supply volume communicated to the main combustion chamber differently during the transient operating condition and a steady state operating condition of the internal combustion engine, and the surplus of the supply volume is greater during the transient operating condition relative to the steady state operating condition.

* * * * *